United States Patent [19]

Toryu et al.

[11] 4,196,709
[45] Apr. 8, 1980

[54] AFTER BURNING PREVENTIVE SYSTEM FOR AN INTERNAL COMBUSTION ENGINE

[75] Inventors: Kazuo Toryu, Tokyo; Fumio Okada, Higashi-kurume; Hiraki Sawada, Seki, all of Japan

[73] Assignee: Nissan Motor Company, Limited, Japan

[21] Appl. No.: 865,444

[22] Filed: Dec. 29, 1977

[30] Foreign Application Priority Data

Jan. 6, 1977 [JP] Japan ..................... 52-678

[51] Int. Cl.² ........................................... F02M 23/04
[52] U.S. Cl. ..................... 123/124 R; 137/480; 123/97 B; 123/119 D; 261/DIG. 19; 261/DIG. 55; 261/69 R
[58] Field of Search .......... 123/97 B, 119 D, 119 DB, 123/124 R, 124 A, 124 B, 103 R; 137/480; 261/DIG. 19, DIG. 55, 69 R

[56] References Cited

U.S. PATENT DOCUMENTS

| | | | |
|---|---|---|---|
| 2,955,615 | 10/1976 | Miller | 123/97 B |
| 3,364,909 | 1/1968 | Mick | 123/103 R |
| 3,554,173 | 1/1971 | Masaki | 123/97 B |
| 3,795,230 | 3/1974 | Yoshimura | 123/97 B |
| 3,795,237 | 3/1974 | Denton | 123/97 B |
| 3,841,282 | 10/1974 | Rogerson | 123/97 B |
| 3,852,391 | 12/1974 | Hisatomi et al. | 123/97 B |
| 3,866,588 | 2/1975 | Nakada et al. | 123/119 D |
| 3,955,364 | 5/1976 | Lewis | 123/124 R |
| 4,098,241 | 7/1978 | Tateno et al. | 123/97 B |

Primary Examiner—Wendell E. Burns
Attorney, Agent, or Firm—Lane, Aitken & Ziems

[57] ABSTRACT

The accumulator chamber communicates with the atmosphere through a passage which is formed therein with a restriction for restricting the cross sectional area of the passage or which is provided therein with a pressure control valve for opening the passage in response to a difference between the atmospheric pressure and the vacuum in the accumulator chamber which difference is above a predetermined value to maintain the vacuum differential between the accumulator and vacuum chambers above a predetermined value when the engine suction vacuum is above a predetermined value.

10 Claims, 2 Drawing Figures

AFTER BURNING PREVENTIVE SYSTEM FOR AN INTERNAL COMBUSTION ENGINE

BACKGROUND OF THE INVENTION

1. Field of the Invention

The present invention relates generally to an after burning preventive system for an internal combustion engine and particularly to a system for feeding additional air into an internal combustion engine of a motor vehicle during deceleration thereof to prevent the engine from being fed with an excessively enriched air-fuel mixture which causes afterburning thereof in the exhaust system of the engine.

2. Description of the Prior Art

As is well known in the art, with an internal combustion engine an air-fuel mixture drawn into the engine is temporarily excessively enriched and afterburning of unburned components in exhaust gases of the engine takes place in the exhaust system when the throttle valve of the intake system such as the carburetor is closed during a gear change operation of the transmission of a motor vehicle having the engine or deceleration of the vehicle. As a solution to this problem, the engine is provided with an after burning preventive system which includes an additional air supply passageway providing communication between the atmosphere and the intake passageway downstream of the throttle valve, a flow control valve for controlling the flow of air passing through the additional air supply passageway, and a diaphragm unit for operating the flow control valve. The diaphragm unit has a vacuum chamber receiving the engine suction vacuum and an accumulator chamber separated from the vacuum chamber by a flexible diaphragm and having a predetermined volume. The diaphragm is operatively connected to the flow control valve. When the vacuum differential between the vacuum and accumulator chambers is increased above a predetermined value, the flow control valve is operated by the diaphragm to open the additional air supply passageway. Additional air is temporarily fed into the intake passageway through the opened additional air supply passageway thereby to prevent an air-fuel mixture drawn into the engine from being excessively enriched and to prevent afterburning of engine exhaust gases in the exhaust system.

However, with a conventional after burning preventive system the accumulator chamber has communicated with only the vacuum chamber through an orifice formed through the diaphragm. As a result, the flow control valve has been opened only while the vacuum differential between the accumulator and vacuum chambers is above a predetermined value. Since the opening time of the flow control valve has been relatively short and at a value within the range of about 1.25 to 1.65 seconds, the conventional after burning preventive system has been capable of maintaining the open condition of the flow control valve in the case that the vehicle is temporarily decelerated. However, in the case that the vehicle is continuously decelerated as when the engine is employed as a brake of the vehicle which descends a lengthy slope or in the case that the vehicle is decelerated at a steady low speed with the opening degree of the throttle valve at a small value near an opening degree for idling of the engine, it has been impossible to maintain the open condition of the flow control valve and therefore to prevent afterburning of engine exhaust gases in the exhaust system.

SUMMARY OF THE INVENTION

It is, therefore, an object of the invention to provide an after burning preventive system which is capable of feeding additional air into the intake passageway of the engine and preventing the occurrence of afterburning of engine exhaust gases in the exhaust system even when the vehicle is decelerated continuously or at a steady low speed.

This object is accomplished by providing means for retaining the open condition of the flow control valve while the engine suction vacuum in the intake passageway is above a predetermined value. The retaining means comprises a passage or conduit providing communication between the accumulator chamber and the atmosphere and a restriction formed in the passage for restricting it or a vacuum operated pressure control valve located in the passage for opening and closing it in response to vacuums in the accumulator chamber which are above and below a predetermined value, respectively.

BRIEF DESCRIPTION OF THE DRAWINGS

This and other features and advantages of the invention will become more apparent from the following detailed description taken in connection with the accompanying drawings in which.

DESCRIPTION OF THE SPECIFIC EMBODIMENTS

Figure 1:
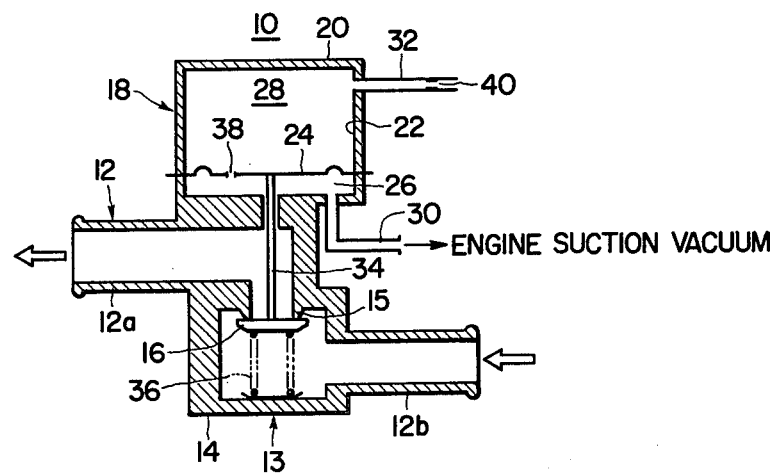
FIG. 1 is a schematic cross sectional view of a first preferred embodiment of an after burning preventive system according to the invention.

Referring to FIG. 1 of the drawings, there is shown an after burning preventive system according to the invention. The after burning preventive system, generally designated by the reference numeral 10, is combined with an internal combustion engine including an intake passageway providing communication between the atmosphere and the engine for conducting air or an air-fuel mixture into the engine, a mixture forming device such as, for example, a carburetor which forms the air-fuel mixture, and a throttle valve rotatably mounted in the intake passageway for controlling the flow of fluid passing therein.

The after burning preventive system 10 comprises an additional air supply passageway or conduit 12 providing communication between the atmosphere and the intake passageway at a first location downstream of the throttle valve or an intake manifold of the engine. The passageway 12 can be arranged in such a manner as to connect the intake passageway between an engine air cleaner located therein and the throttle valve with the intake passageway at the first location. Alternatively, the passageway 12 can be arranged to directly interconnect the clean side of the air cleaner and the intake passageway at the first location.

A flow control valve device 13 is provided in the additional air supply passageway 12 for controlling the flow of air passing therethrough and comprises a housing 14 located in the passageway 12 to divide it into passageways 12a and 12b and formed therein with a valve seat 15. The passageways 12a and 12b both communicate with the interior of the housing 14. A vacuum operated control valve 16 is movably disposed in the housing 14 to be seatable on and unseatable from the valve seat 15. The control valve 16 separates the passageways 12a and 12b from each other to close the passageway 12 when it is seated on the valve seat 15. The control valve 16 allows communication between the passageways 12a and 12b to open the passageway 12 when it is unseated from the valve seat 15. A diaphragm device 18 is provided for operating the control valve 16 and comprises a housing 20 defining a cavity 22, a flexible pressure responsive diaphragm 24 dividing the cavity 22 into vacuum and accumulator chambers 26 and 28. The vacuum chamber 26 communicates through a passage or a conduit 30 with the intake passageway at a second location downstream of the throttle valve or with the intake manifold to receive an engine suction vacuum therein. The accumulator chamber 28 communicates with the atmosphere through a passage or a conduit 32. The diaphragm 24 is operatively connected to the control valve 16 through a valve stem or rod 34. A spring 36 is provided for urging the control valve 16, the valve stem 34 and the diaphragm 24 into a position in which the control valve 16 closes the passageway 12.

The diaphragm 24 is formed therethrough with an orifice 38 which provides communication between the vacuum and accumulator chambers 26 and 28. The passage 32 is formed therein with a restricted orifice or passage or a restriction 40 for restricting the cross sectional area of the passage 32. The orifice 40 has a cross sectional area smaller than or equal to that of the orifice 38 of the diaphragm 24 in such a manner that the interior of the accumulator chamber 28 is maintained at a vacuum intervening between the vacuum in the vacuum chamber 26 and the atmosphere. For example, the diameter of the orifice 38 may be 0.5 mm and the diameter of the orifice 40 may be 0.4 mm. A porous material such as ceramics, sintered alloy, or the like can be disposed in the passage 32 in place of the orifice 40. The passage 32 and the restricted passage 40 serve as means for retaining opening of the control valve 16 during deceleration of the vehicle or when the engine suction vacuum is above a predetermined value. The control valve 16 is designed in such a manner that it is unseated from the valve seat 15 in opposition to the force of the spring 36 to open the passageway 12 when the vacuum differential between the vacuum and accumulator chambers 26 and 28 is above a first predetermined value such as, for example, a value which is within the range of $-250$ to $-300$ mmHg. Also, the diaphragm unit 18 is constructed in such a manner that the vacuum differential between the vacuum and accumulator chambers 26 and 28 is maintained above the first predetermined value and therefore the control valve 16 is operated by the diaphragm 24 to continuously open the passageway 12 whenever the engine suction vacuum is above a second predetermined value such as, for example, $-550$ mmHg above which the engine suction vacuum is increased whenever the engine is running with the throttle valve closed fully or a certain amount for deceleration of the vehicle.

The after burning preventive system 10 thus described is operated in the following manner.

When the throttle valve is abruptly closed as when a gear change is performed in a transmission of a motor vehicle equipped with the engine or as when the vehicle is temporarily decelerated, the suction vacuum fed into the vacuum chamber 26 of the diaphragm unit 18 is abruptly increased from a low value such as, for example, $-100$ mmHg to a high value such as, for example, $-500$ mmHg. As a result, since the vacuum differential between the vacuum and accumulator chambers 26 and 28 is increased above the aforementioned first predetermined value such as, for example, a value within the range of $-250$ to $-300$ mmHg, the diaphragm 24 is moved or deformed in opposition to the action of the spring 36 into a position in which the control valve 16 is unseated from the valve seat 15 to open the passageway 12. Accordingly, since atmospheric air purified by the air cleaner is fed into the intake passageway downstream of the throttle valve or the intake manifold, an air-fuel mixture to be burned in a combustion chamber of the engine is prevented from being excessively enriched so that the event or situation is avoided that the combustion chamber of the engine is fed with an excessively enriched air-fuel mixture which is not satisfactorily or properly burned in the engine combustion chamber and which causes the after burning thereof in the exhaust system of the engine.

When the vehicle is at a decelerated condition at a steady low speed with the throttle valve at a small opening degree near an opening degree for idling of the engine or when the vehicle is continuously decelerated as when the engine is employed as a brake of the vehicle, the vacuum differential between the vacuum and accumulator chambers 26 and 28 is increased above the aforementioned first predetermined value at the initial stage of closing of the throttle valve as mentioned hereinbefore so that the control valve 16 is operated by the diaphragm 24 to open the passageway 12. The vacuum differential between the chambers 26 and 28 is subsequently apt to be reduced below the aforementioned first predetermined value due to the continuation of closing of the throttle valve and the presence of the orifice 38 of the diaphragm 24 so that the control valve 167 is apt to close the passageway 12. However, since the after burning preventive system 10 is constructed and arranged in such a manner that whenever the engine suction vacuum is above the aforementioned second predetermined value above which the suction vacuum is increased when the throttle valve is closed a certain amount for deceleration of the vehicle, the vacuum differential between the chambers 26 and 28 is maintained above the first predetermined value as mentioned hereinbefore, the control valve 16 continues to open the passageway 12. As a result, atmospheric air is continuously fed into the intake passageway downstream of the throttle valve or the intake manifold to prevent the occurrence of after-burning of an unburned air-fuel mixture in the exhaust system of the engine even when the vehicle is continuously decelerated or is at a decelerated condition at a steady low speed.

Figure 2:
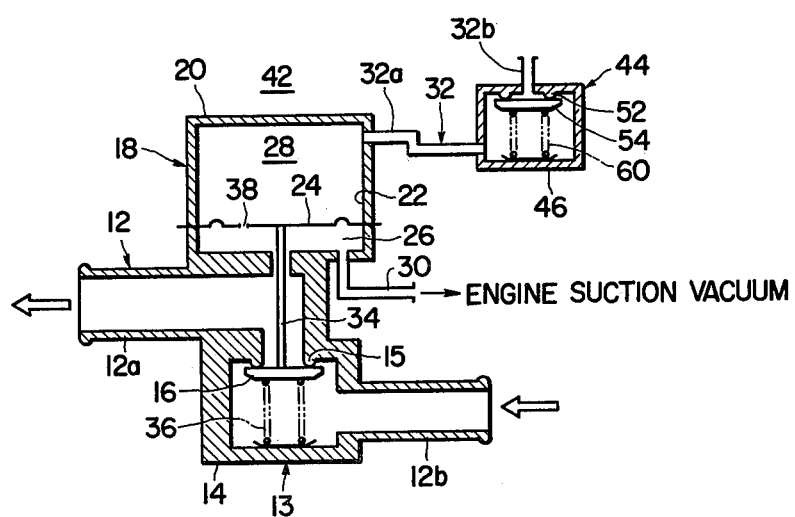
FIG. 2 is a schematic cross sectional view of a second preferred embodiment of an after burning preventive system according to the invention.

Referring to FIG. 2 of the drawings, there is shown a second preferred embodiment of an after burning preventive system according to the invention. In FIG. 2, the same component elements or parts as those of the after burning preventive system 10 shown in FIG. 1 are designated by the same reference numerals as those used in FIG. 1. The description of the same component elements is omitted for brevity. As shown in FIG. 2, the after burning preventive system, generally designated by the reference numeral 42, is characterized in that a pressure control valve device 44 is disposed in the passage 32 in place of the restricted orifice 40 of the after burning preventive system 10 of FIG. 1. The pressure control valve device 44 comprises a housing 46 located in the passage 32 to divide it into passage 32a and 32b and formed therein with a valve seat 52. The passages 32a and 32b both communicate with the interior of the housing 46. A vacuum operated control valve 54 is movably located in the housing 46 to be seatable on and unseatable from the valve seat 52. The control valve 54 separates the passages 32a and 32b from each other to close the passage 32 when it is seated on the valve seat 52. The control valve 54 allows communication between the passages 32a and 32b to open the passage 32 when it is unseated from the valve seat 52. A spring 60 is provided to urge the control valve 54 into a position in which the control valve 54 is seated on the valve seat 52. The spring 60 also urges the control valve 54 in a direction opposed by the atmospheric pressure when the control valve 54 is seated on the valve seat 52. The valve 54 is seated on the valve seat 52 to close the passage 32 when the vacuum in the accumulator chamber 28 is below a predetermined valve. The valve 54 is disengaged from the valve seat 52 by the pressure differential between the atmosphere and the accumulator chamber 28 in opposition to the force of the spring 60 to open the passage 32 when the vacuum in the accumulator chamber 28 is increased above the predetermined value.

With the after burning preventive system 42 thus described, when the throttle valve is temporarily abruptly closed for a gear change operation of the transmission or a temporary deceleration of the vehicle, the vacuum differential between the vacuum and accumulator chambers 26 and 28 is increased above the aforementioned first predetermined value so that the diaphragm 24 is moved into a position in which the control valve 16 opens the passageway 12, similarly to the after burning preventive system 10 of FIG. 1. When the vehicle is decelerated continuously or at a steady low speed, the vacuum differential between the chambers 26 and 28 is increased above the first predetermined value to open the control valve 16 at the initial stage of closing of the throttle valve. Owing to the continuation of closing of the throttle valve, when the vacuum in the accumulator chamber 28 is increased above a predetermined value so that the vacuum differential between the chambers 26 and 28 is reduced below the first predetermined value, the control valve 54 is disengaged from the valve seat 52 in response to the difference between the atmospheric pressure and the vacuum in the chamber 28 to open the passage 32. Thus, the control valve 16 is maintained at a condition in which it opens the passageway 12 until the vacuum in the accumulator chamber 28 is reduced below a predetermined value due to decrease in the engine suction vacuum. Accordingly, atmospheric air is fed into the intake passageway downstream of the throttle valve to prevent the occurrence of afterburning of an unburned air-fuel mixture in the exhaust system of the engine, similarly to the after burning preventive system 10 of FIG. 1.

The housing 46 can communicate with the atmosphere through a port or an opening provided in place of the passage 32b.

In the after burning preventive systems 10 and 42 shown in FIGS. 1 and 2, the accumulator chamber 28 can communicate with the atmosphere through a port or an opening provided in place of the passage means 32. In this instance, the restriction 40 is formed in the port or the opening. The restriction 40 can be dispensed with. The housing 46 is directly connected to the port or the opening of the accumulator chamber 28 and communicates with the atmosphere through a port or an opening provided in place of the passage 32b.

It will be thus appreciated that the invention provides an after burning preventive system comprising means for maintaining the vacuum differential between the vacuum and accumulator chambers above a predetermined value to retain an open condition of the additional air flow control valve whenever the engine suction vacuum is above a predetermined value so that afterburning of engine exhaust gases in the engine exhaust system is prevented during all decelerating conditions of the vehicle which include temporary and continuous decelerations, and a steady low speed travel with throttle opening near opening for idling.

What is claimed is:
1. An after burning preventive system for an internal combustion engine, comprising:
   an additional air supply passageway for providing communication between the atmosphere and an intake passageway of the engine at a location downstream of a throttle valve;
   a flow control valve movably disposed in said additional air supply passageway for controlling the flow of air passing through said additional air supply passageway;
   means defining a vacuum chamber and an accumulator chamber;
   a flexible pressure responsive diaphragm separating said vacuum and accumulator chambers from each other and formed therethrough with an orifice providing communication between said vacuum and accumulator chambers;
   passage means for providing communication between said vacuum chamber and the intake passageway downstream of the throttle valve for conducting an engine suction vacuum into said vacuum chamber, said diaphragm being operatively connected to said flow control valve for, in response to a vacuum differential between said vacuum and accumulator chambers which is above a first predetermined value, moving said flow control valve into a position in which said flow control valve opens said additional air supply passage and for, in response to vacuum differential between said vacuum and accumulator chambers which is below said first predetermined value, moving said flow control valve into a position in which said flow control valve closes said additional air supply passage; and
   means defining a flow restriction between said accumulator chamber and the ambient atmosphere for controlling the admission of air into said accumulator chamber in proportion to the pressure differential prevailing between said accumulator chamber and the ambient atmosphere, said flow restriction providing a flow restriction not less than that of said orifice.

2. An after burning preventive system as claimed in claim 1, in which said defining means comprises
   second passage means providing communication between said accumulator chamber and the atmosphere and formed therein with orifice means which restricts the cross sectional area of said second passage means.

3. An after burning preventive system as claimed in claim 1, in which said defining means comprises
   second passage means providing communication between said accumulator chamber and the atmosphere, and a pressure control valve movably disposed in said second passage means for opening it in response to a difference between the atmospheric pressure and the vacuum in said accumulator chamber which difference is above a second predetermined value and for closing said second passage means in response to a difference between the atmospheric pressure and the vacuum in said accumulator which difference is below said second predetermined value.

4. An after burning preventive system as claimed in claim 1, in which said defining means comprises
a housing the interior of which communicates with the atmosphere,
means defining a passage which provides communication between said accumulator chamber and said interior of said housing,
a valve seat formed in said interior of said housing,
a pressure control valve movably located in said interior of said housing, said pressure control valve being engaged with said valve seat in response to a difference between the atmospheric pressure and the vacuum in said accumulator chamber which difference is below a second predetermined value to separate said accumulator chamber from the atmosphere and being disengaged from said valve seat in response to a difference between the atmospheric pressure and the vacuum in said accumulator chamber which difference is above said second predetermined value to allow communication between said accumulator chamber and the atmosphere, and
a spring for urging said pressure control valve toward said valve seat and in a direction opposed by the atmospheric pressure.

5. An after burning preventive system for an internal combustion engine, comprising:
an additional air supply passageway for providing communication between the atmosphere and an intake passageway of the engine at a location downstream of a throttle valve,
a flow control valve movably disposed in said additional air supply passageway for controlling the flow of air passing through said additional air supply passageway,
means defining a vacuum chamber and accumulator chamber,
a flexible pressure responsive diaphragm separating said vacuum and accumulator chambers from each other and formed therethrough with an orifice providing communication between said vacuum and accumulator chambers,
passage means for providing communication between said vacuum chamber and the intake passageway downstream of the throttle valve for conducting an engine suction vacuum into said vacuum chamber, said diaphragm being operatively connected to said flow control valve for, in response to a vacuum differential between said vacuum and accumulator chambers which is above a first predetermined value, moving said flow control valve into a position in which said flow control valve opens said additional air supply passageway and for, in response to a vacuum differential between said vacuum and accumulator chambers which is below said first predetermined value, moving said flow control valve into a position in which said flow control valve closes said additional air supply passageway, and
means for retaining opening of said flow control valve when the vacuum in said accumulator chamber is above a predetermined value, said retaining means comprising
second passage means providing communication between said accumulator chamber and the atmosphere, and
a pressure control valve movably disposed in said second passage means for opening it in response to a difference between the atmospheric pressure and the vacuum in said accumulator chamber which difference is above a second value and for closing said second passage means in response to a difference between the atmospheric pressure and the vacuum in said accumulator chamber which difference is below said second predetermined value.

6. An after burning preventive system for an internal combustion engine, comprising:
an additional air supply passage for providing communication between the atmosphere and an intake passageway of the engine at a location downstream of a throttle valve;
a flow control valve movably disposed in said additional air supply passage for controlling the flow of air passing through said additional air supply passageway;
means defining a vacuum chamber and accumulator chamber;
a flexible pressure responsive diaphragm separating said vacuum and accumulator chambers from each other and formed therethrough with an orifice providing communication between said vacuum and accumulator chambers;
passage means for providing communication between said vacuum chamber and the intake passageway downstream of the throttle valve for conducting an engine suction vacuum into said vacuum chamber, said diaphragm being operatively connected to said flow control valve for, in response to a vacuum differential between said vacuum and accumulator chambers which is above a first predetermined value, moving said flow control valve into a position in which said flow control valve opens said additional air supply passageway and for, in response to a vacuum differential between said vacuum and accumulator chambers which is below said first predetermined value, moving said flow control valve into a position in which said flow control valve closes said additional air supply passageway; and
means for retaining opening of said flow control valve when the vacuum in said accumulator chamber is above a predetermined value, said retaining means comprising
a housing the interior of which provides communication between said accumulator chamber and said interior of said housing,
a valve seat formed in said interior of said housing,
a pressure control valve movably located in said interior of said housing, said pressure control valve being engaged with said valve seat in response to a difference between the atmospheric pressure and the vacuum in said accumulator chamber which difference is below a second predetermined value to separate said accumulator chamber from the atmosphere and being disengaged from said valve seat in response to a difference between the atmospheric pressure and the vacuum in said accumulator chamber which difference is above said second predetermined value to allow communication between said accumulator chamber and the atmosphere, and a spring for urging said pressure control valve toward said valve seat and in a direction opposed by the atmospheric pressure.

7. In an internal combustion engine, an intake passageway having a throttle valve disposed therein;

a conduit fluidly communicating at one end with said intake passageway at a location downstream of said throttle valve and at the other end thereof with the atmosphere;

a fluid flow control valve disposed in said conduit for controlling the flow of air from the atmosphere into said intake passageway;

a vacuum motor having a vacuum chamber fluidly communicated with said intake passageway at a location downstream of said throttle valve, an accumulator chamber fluidly communicated with the atmosphere, and a flexible diaphragm separating said vacuum and accumulator chambers and connected to said fluid flow control valve;

a first flow restriction disposed in an aperture formed in said diaphragm; and a second flow restriction disposed between said accumulator chamber and the atmosphere, said second flow restriction providing a resistance to fluid flow not less than that of said first flow restriction.

8. An internal combustion engine as claimed in claim 7, wherein said first flow restriction is an orifice and said second restriction is an orifice having a smaller diameter bore than said first orifice.

9. An internal combustion engine as claimed in claim 7, wherein said first flow restriction is an orifice and said second restriction is a valve which opens upon a predetermined pressure difference prevailing between the atmosphere and said accumulator chamber.

10. A fluid flow control valve comprising:

an inlet;

an outlet;

a valve seat disposed between said inlet and said outlet;

a valve member seatable on said valve seat for cutting off fluid communication between said inlet and said outlet;

biasing means for biasing said valve member toward said valve seat;

means defining a first chamber adapted for fluid communication with a source of variable vacuum;

means defining a second chamber adapted for fluid communication with the atmosphere;

a flexible diaphragm separating said first and second chambers and connected to said valve member for moving said valve member against the bias of said biasing means in response to the pressure in said first chamber falling below that in said second chamber;

a first flow restriction providing fluid communication between said first and second chambers; and a second flow restriction through which said second chamber fluidly communicates with the atmosphere, said second flow restriction providing a flow restriction not less than that of said first flow restriction.

* * * * *